(12) United States Patent
Schad et al.

(10) Patent No.: US 8,337,196 B2
(45) Date of Patent: Dec. 25, 2012

(54) LOCKING DEVICE FOR AN INJECTION MOLDING MACHINE

(75) Inventors: Robert D. Schad, Toronto (CA); Carsten Link, Burlington, CA (US)

(73) Assignee: Athena Automation Ltd., Vaughan (CA)

( * ) Notice: Subject to any disclaimer, the term of this patent is extended or adjusted under 35 U.S.C. 154(b) by 10 days.

(21) Appl. No.: 13/078,581

(22) Filed: Apr. 1, 2011

(65) Prior Publication Data

US 2011/0236527 A1    Sep. 29, 2011

Related U.S. Application Data

(63) Continuation of application No. PCT/CA2009/001400, filed on Oct. 2, 2009.

(60) Provisional application No. 61/102,633, filed on Oct. 3, 2008.

(51) Int. Cl.
*B29C 45/64* (2006.01)

(52) U.S. Cl. .................................................. 425/595

(58) Field of Classification Search ............... 425/451.9, 425/595
See application file for complete search history.

(56) References Cited

U.S. PATENT DOCUMENTS

| | | |
|---|---|---|
| 2,711,561 A | 6/1955 | Studli |
| 2,916,768 A | 12/1959 | Quere et al. |
| 2,976,569 A | 3/1961 | Quere et al. |
| 3,604,058 A | 9/1971 | Fischbach |
| 3,975,133 A | 8/1976 | Nussbaumer |
| 4,285,384 A | 8/1981 | Wunder |
| 5,417,913 A | 5/1995 | Arend |
| 5,620,723 A | 4/1997 | Glaesener et al. |
| 5,624,695 A | 4/1997 | Glaesener et al. |
| 5,645,875 A | 7/1997 | Glaesener et al. |
| 5,753,153 A | 5/1998 | Choi |
| 5,853,773 A | 12/1998 | Choi |
| 5,868,989 A | 2/1999 | Glaesener et al. |

(Continued)

FOREIGN PATENT DOCUMENTS

AT          412856 B         8/2005

(Continued)

OTHER PUBLICATIONS

European Patent Office, EP Appn. No. 009817156.4, European Search Report, Jul. 25, 2012, 8 pgs.

*Primary Examiner* — James Mackey
(74) *Attorney, Agent, or Firm* — Bereskin & Parr LLP/S.E.N.C.R.L, s.r.l.

(57) ABSTRACT

A locking device, releasably securing a tie bar to a platen, includes a housing with a bearing surface affixed to the platen coaxial with the tie bar, and a rotatable lock nut received in the housing and comprising: an inner bore with radial elements engaging the tie bar to transfer an axial clamp load to the lock nut, the elements defining an engagement portion along a lock nut first axial extent; an outer surface with at least a first step face abutting the bearing surface to transfer the axial damp load to the platen, the step face having a first radially outer extent; and a narrowing section having a second axial extent from a first position having a first diameter proximate the step face to a second position having a second lesser diameter spaced axially towards a second platen, the first diameter being less than the first radially outer extent.

20 Claims, 8 Drawing Sheets

U.S. PATENT DOCUMENTS

| | | |
|---|---|---|
| 5,922,372 A | 7/1999 | Schad |
| 5,928,684 A | 7/1999 | Glaesener et al. |
| 5,928,685 A | 7/1999 | Schad |
| 6,120,722 A * | 9/2000 | Schad .......... 425/595 |
| 6,210,144 B1 | 4/2001 | Mailliet et al. |
| 6,261,505 B1 * | 7/2001 | Glaesener .......... 425/595 |
| 6,381,827 B1 | 5/2002 | Steinbock |
| RE37,827 E | 9/2002 | Schad |
| 6,767,204 B2 | 7/2004 | Fuller et al. |
| 6,893,250 B2 | 5/2005 | Meschia et al. |
| 6,926,515 B2 | 8/2005 | Wohlrab |

FOREIGN PATENT DOCUMENTS

| | | |
|---|---|---|
| CA | 1153175 | 9/1983 |
| CA | 2177950 | 12/1996 |
| DE | 1227642 | 10/1966 |
| EP | 1287967 | 3/2003 |
| EP | 1369218 | 12/2003 |
| EP | 2243615 A1 | 10/2010 |
| GB | 2064415 | 6/1981 |
| GB | 1601419 | 10/1981 |
| JP | 2003136218 | 5/2003 |

* cited by examiner

LOCKING DEVICE FOR AN INJECTION MOLDING MACHINE

This application is a continuation of PCT Patent Application No. PCT/CA2009/001400, filed Oct. 2, 2009, which claims priority from U.S. Provisional Patent Application No. 61/102,633, filed on Oct. 3, 2008, each of which is hereby incorporated herein by reference.

FIELD

The disclosure relates to injection molding machines, elements thereof, and methods and apparatuses for controlling motion of molds in an injection molding machine.

BACKGROUND

U.S. Pat. No. 6,210,144 (Mailliet, et al.) discloses a closing unit for an injection moulding machine that has a movable closing die and a fixed matching die designed as clamping dies for an injection mould, as well as several hydraulic cylinders mounted on the fixed matching die to apply a closing force. A servo-drive allows the drawbars to swivel around their longitudinal axes up to a first and second angular position. A first locking device arranged on the drawbars along a first section A of the drawbars co-operates with second locking device arranged on the movable closing die. In the first angular position of the drawbars, the locking devices allow the movable closing die to move axially with respect to the drawbars, and in a second angular position of the drawbars they transmit the required closing force.

United Kingdom Pat. No. GB1601419 (WARNKE UMFORMTECH VEB K) discloses a mould closing and locking arrangement for injection moulding machines, comprising two mould mounting platens of which one is fixed and the other is movable in relation to said one platen in the closing and opening direction of the mould. The arrangement includes hydraulically actuated cylinder/piston units for moving said other platen towards and away from said one platen, and closing cylinder/piston units are arranged in the fixed platen and each co-operating with one end of a respective force transmitting column passing through the movable platen, for producing mould closing and clamping force after traverse of the movable platen towards the fixed platen. Each said column is mounted rotatably in a supporting platen and anchored therein against relative axial displacement by securing means. Rings are arranged fixed in the movable mould mounting platen, each ring has inner dogs which co-operate with a bush arranged fixed on the respective column. Each said bush is provided with a double collar on the mould side, the collar has recesses through which the inner dogs pass during the mould closing operation, and that follower pins are arranged in the fixed mould mounting platen which slide in cam tracks of a respective column and which facilitate axial movement of the column by the length of the closing stroke and rotary movement through an angle of rotation to lock outer dogs on said collar with the inner dogs on the respective ring.

SUMMARY

The following summary is intended to introduce the reader to various aspects of the applicant's teaching, but not to define any invention. In general, disclosed herein are one or more methods or apparatuses related to injection molding, and to positioning, locking, and clamping molds in injection molding machines.

According to some aspects of the applicant's teaching, a combination is disclosed including first and second platens of an injection molding machine, a tie bar extending from the second platen to the first platen, and a locking device for releasably securing together the tie bar and the first platen. The locking device comprises: a) a housing extending along an axis coaxial with the tie bar and including a first bearing surface affixed to the first platen; b) a lock nut received in the housing and rotatable within the housing about the axis between locked and unlocked positions, the lock nut comprising an inner bore with radially inwardly projecting engagement elements that engage the tie bar when in the locked position to transfer an axial clamp load from the tie bar to the lock nut, the radially inwardly projecting engagement elements provided along a first axial extent of the lock nut and defining a tie bar engagement portion; an outer surface with at least a first step face for abutting the first bearing surface to transfer the axial clamp load from the lock nut to the first platen, the first step face having a first radially outer extent; and the lock nut including a narrowing section having a second axial extent bounded by a first position proximate the first step face and a second position spaced axially from the first step face in a direction towards the second platen, wherein the outer surface has a first diameter at the first position and a second diameter at the second position, the first diameter being less than the first radially outer extent and greater than the second diameter.

In some examples, the second axial extent of the narrowing section extends axially along at least about half of the first axial extent of the tie bar engagement portion. The second axial extent of the narrowing section can extend entirely within the first axial extent of the tie bar engagement portion. The first position can be axially within the tie bar engagement portion, and the second position can be spaced axially from the tie bar engagement portion in a direction towards the second platen so that only a portion of the narrowing section extends within the tie bar engagement portion. At least about 70 percent of an axial extent of the narrowing section can be within the axial extent of the tie bar engagement portion.

In some examples, the lock nut further comprises a major load portion having a third axial extent bounded by the first step face and a first one of the plurality of radially inwardly projecting engagement elements, the first one of the radially inwardly projecting engagement elements being axially nearest the second platen. The second axial extent of the narrowing section, in some examples, overlaps at least about half of the third axial extent of the major load portion. The second axial extent of the narrowing section can overlap at least about 80 percent of the third axial extent of the major load portion. The third axial extent of the major load portion can extend entirely within the second axial extent of the narrowing section.

In some examples, the first diameter is at least about 5 percent larger than the second diameter. The first diameter can be between about 5% and about 30% larger than the second diameter.

In some examples, the outer surface between the first and second positions comprises a taper. The taper and the axis can define a lock nut taper angle that is generally constant over an axial extent of the taper. The lock nut taper angle can be at least about 5 degrees, or can be between about 5 and about 35 degrees.

In some examples, an inner surface of the housing comprises a relief portion in facing relation to the taper, the taper and the axis define a lock nut taper angle, the portion of the inner surface and axis define a relief angle, and the lock nut taper angle is greater than the relief angle. The diameter of the relief portion of the inner surface can decrease in a direction of the axial clamp load, i.e. in a direction towards the second platen.

In some examples, the narrowing section includes a stepped section. The housing can comprise at least a second bearing surface, and the stepped section can comprise at least a second step face for abutting the second bearing surface. The second step face can have a second outer radial extent less than the first diameter of the first position. The second position can be spaced from the second step face in a direction towards the second platen.

In some examples, the first step face and the first bearing surface can be generally annular having respective inner and outer radial extents, the outer radial extent of the first step face being greater than the inner radial extent of the first bearing surface.

According to some aspects, a combination of first and second platens of an injection molding machine, a tie bar extending from the second platen to the first platen, and a locking device for releasably securing together the tie bar and the first platen is disclosed. The locking device comprises: a) a housing extending along an axis coaxial with the tie bar and including a first bearing face; and b) a lock nut received in the housing and rotatable within the housing about the axis between locked and unlocked positions. The lock nut comprises an inner bore with radially inwardly projecting engagement elements that engage the tie bar when in the locked position to transfer an axial clamp load from the tie bar to the lock nut. The lock nut further comprises an outer surface with at least a first step face for abutting the first bearing face to transfer the axial clamp load from the lock nut to the first platen. A tie bar engagement portion is defined by the axial extent of the lock nut along which the radially inwardly projecting engagement elements extend. A narrowing section extends at least partially within the tie bar engagement portion and extends axially from a first position adjacent the first step face to a second position spaced from the first step face in a direction of the axial clamp load. The outer surface has a first diameter at the first position and a second diameter at the second position. The first diameter being greater than the second diameter.

The narrowing section may extend axially along at least about half of the axial extent of the tie bar engagement portion.

The narrowing section may extend entirely within the tie bar engagement portion. Alternately, less than the entire axial extent of the narrowing section may overlap the tie bar engagement portion. In some examples, at least 70 percent of the axial extent of the narrowing section may be within the tie bar engagement portion. In some examples, the first position may be axially within the tie bar engagement portion, and the second position may be spaced axially from the tie bar engagement portion in a direction of the axial clamp load so that only a portion of the narrowing section extends within the tie bar engagement portion.

The lock nut may further comprise a proximal seal journal adjacent the second position. The seal journal may have an outer seal diameter. The outer seal diameter may be greater than the second diameter at the second position. Alternatively, an outer diameter of the seal journal may be substantially equal to the diameter at the second position. At least a portion of the proximal seal journal may be positioned between the proximal end of the nut and the tie bar engagement portion. In some examples, the proximal seal journal may be positioned entirely between the major load portion and the proximal end of the nut.

The first diameter may be at least about 5 percent larger than the second diameter, and more specifically, may be between about 5% and about 30% larger than the second diameter.

The outer surface between the first and second positions may comprise a taper. The taper and the axis may define a lock nut taper angle that is generally constant over an axial extent of the taper. The axis and the taper may define a lock nut taper angle of at least about 5 degrees, and more particularly, of between about 5 and about 35 degrees.

An inner surface of the housing may comprise a portion in facing relation to the taper. The taper and the axis may define a lock nut taper angle, the portion of the inner surface and axis may define a housing angle, and the lock nut taper angle may be greater than the housing angle. The diameter of the portion of the inner surface may decrease in a direction of the axial clamp load.

The narrowing section may be a stepped section. The housing may comprise at least a second bearing surface, and the stepped section may comprise at least a second step face for abutting the second bearing surface. The second step face may have a diameter less than the diameter of the first position. The second position may be spaced from the second step face in a direction of the axial clamp load.

The first step face and the first bearing surface may be generally annular having respective inner and outer radial extents. The outer radial extent of the first step face may be greater than the inner radial extent of the first bearing surface.

According to some aspects, a combination including first and second platens of an injection molding machine, a tie bar extending from the second platen to the first platen, and a locking device for releasably securing together the tie bar and first the platen is disclosed. The locking device comprises: a) a housing extending along an axis coaxial with the tie bar and including a first bearing surface and a second bearing surface affixed to the first platen, the second bearing surface spaced axially apart from the first bearing surface by a first housing spacing; and b) a lock nut received in the housing and rotatable within the housing about the axis between locked and unlocked positions, the lock nut including an inner bore with radially inwardly projecting engagement elements that engage the tie bar when in the locked position to transfer an axial clamp load from the tie bar to the lock nut, and the lock nut including an outer surface with first and second step faces for abutting the first and second bearing surfaces, respectively, to cooperatively transfer the axial clamp load from the lock nut to the first platen.

In some examples, the first step face abuts the first bearing surface when the axial load is applied to the nut and when the nut is unloaded. The second step face can also abut the second bearing surface when loaded or unloaded. In same examples, the second step face can be spaced apart from the second bearing surface when the lock nut is unloaded, and the second step face can abut the second bearing surface when the axial clamp load is applied to the nut. The second step face can be spaced axially apart from the first step face by a proximal nut spacing, the proximal nut spacing being less than the first housing spacing when the nut is unloaded, the difference between the first nut spacing and the first housing spacing defining a first stretch gap.

In some examples, the housing can further comprise a third bearing surface intermediate the first and second bearing surfaces, the third bearing surface spaced axially apart from the first bearing surface by an intermediate housing spacing, and the nut comprising a third step face adjacent the third bearing surface for cooperating with the first and second step faces and the respective bearing surfaces to transfer the axial clamp load from the nut to the first platen. The third step face can be spaced apart from the third bearing surface when the lock nut is unloaded, and wherein the third step face abuts the third bearing surface when the axial clamp load is applied to the nut. The third step face can be spaced axially apart from the first step face by an intermediate nut spacing, the intermediate nut spacing being less than the intermediate housing spacing when the nut is unloaded, the difference between the first nut spacing and the first housing spacing defining a second stretch gap.

In some examples, the first stretch gap is greater than the second stretch gap. The first step face can be axially distal the second platen, and the second step face can be axially proximal the second platen. The first step face and the first bearing surface can be generally annular having respective inner and outer radial extents, the outer radial extent of the first step face being greater than the inner radial extent of the first bearing surface. The second step face and the second bearing surface can be generally annular having respective inner and outer radial extents, the outer radial extent of the second step face being greater than the inner radial extent of the second bearing surface. The outer radial extent of the second step face can be less than the inner radial extent of the first bearing surface.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
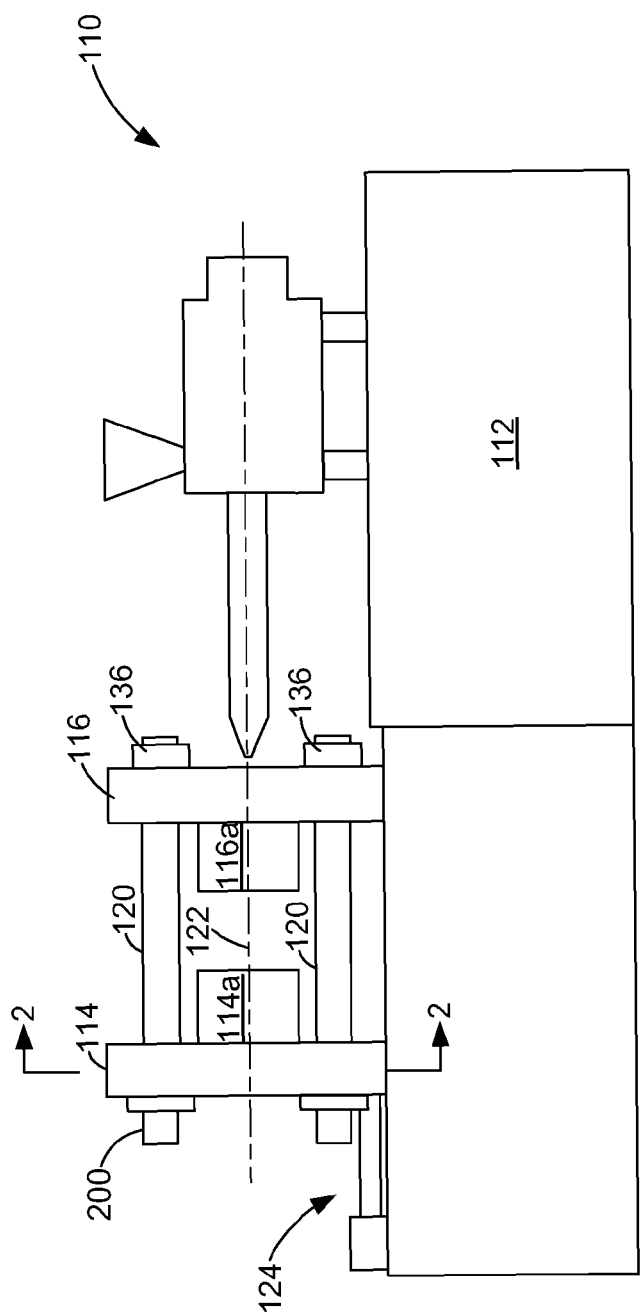
FIG. 1 is a side elevation view of an injection molding machine.

Referring now to FIG. 1, an injection molding machine 110 includes a base 112 and a first platen 114 and a second platen 116 each mounted on the base 112. The machine 110 is, in the example illustrated, a two-platen injection molding machine. The first platen 114 is movable relative to the second platen 116 between open and closed positions. In the example illustrated, the second platen 116 is generally stationary relative to the base 112 during operation of the machine 110, and is also referred herein as stationary platen 116. The first platen 114, in the example illustrated, moves relative to the base 112 during operation of the machine 110 and is also referred herein as moving platen 114.

When in the closed position, the platens 114, 116 are drawn together. When in the open position (as shown in FIG. 1), the platens 114, 116 are separated to facilitate removal of a molded article from a mold formed at least in part by first and second mold halves (mold portions) 114a, 116a affixed to the platens 114, 116, respectively.

Figure 2:
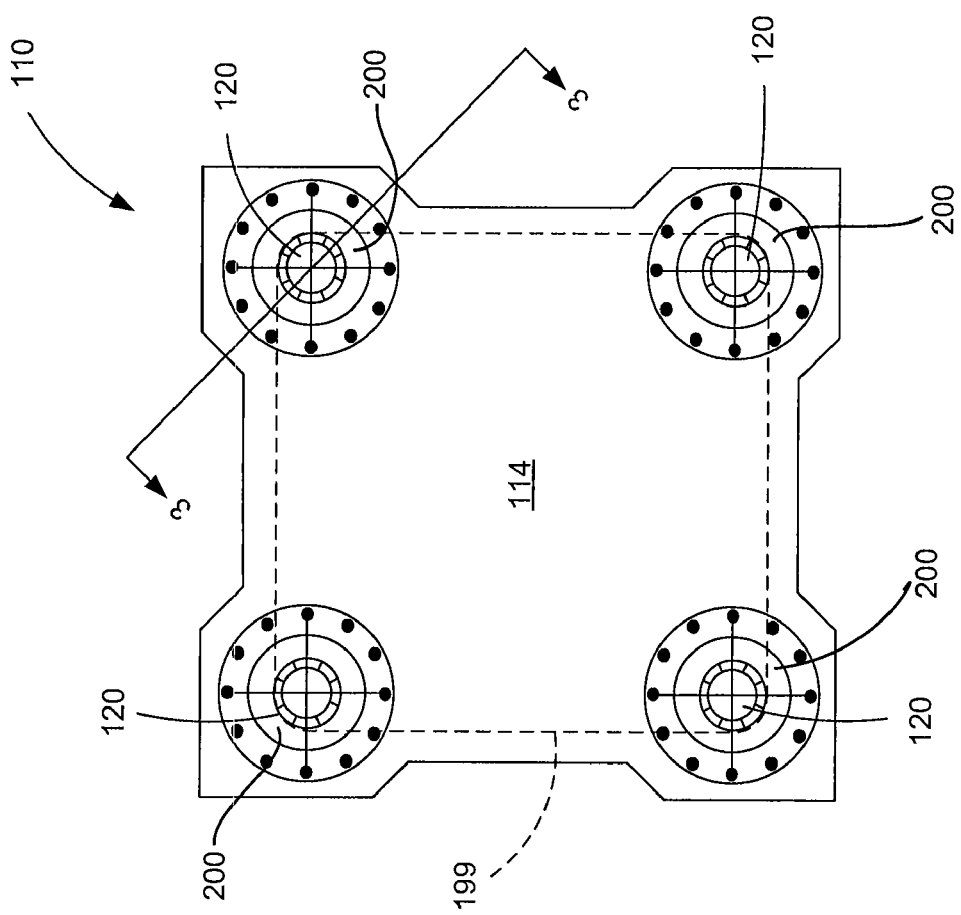
FIG. 2 is an end view of an upper portion of the machine of FIG. 1, showing a plurality of locking devices.

The machine 110 includes at least one tie bar 120 extending between the first and second platens 114, 116 for coupling the platens 114, 116 together. In the example illustrated, four tie bars 120 are provided. Each of the four tie bars 120 are positioned generally at respective corners of the two platens 114, 116 (FIG. 2). The tie bars 120 generally comprise elongate members aligned in parallel with a machine axis 122 (FIG. 1) along which the moving platen 114 translates (each tie bar 120 having a tie bar axis 123—shown in FIG. 3—parallel to the machine axis 122). A traverse actuator 124 can be coupled to the moving platen 116 to move the platen 116 between the open and closed positions. In the example illustrated, the traverse actuator 124 comprises a ball screw driven by a motor and in engagement with a nut fixed, for example, to the moving platen 114. In other examples, a belt drive system could be used as a linear actuator to move the moving platen 114 between the open and closed positions. One or more relatively long stroke, small diameter fluid cylinders could also be used as the traverse actuator.

Figure 3:
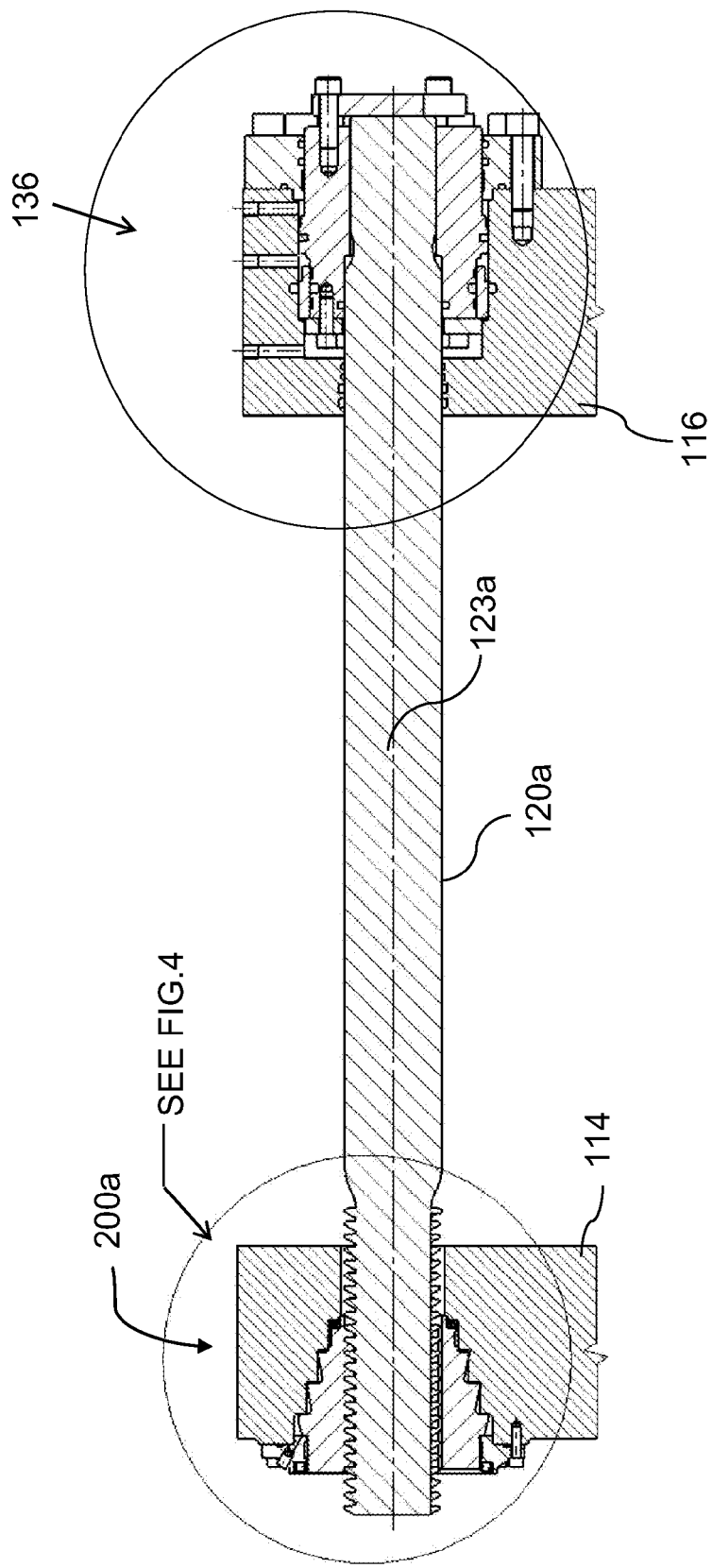
FIG. 3 is a cross-sectional view of a portion of the machine of FIG. 2, taken along the lines 3-3.

Referring to FIGS. 2 and 3, the machine 110 further includes at least one locking device 200 to selectively (and releasably) lock one of the platens 114, 116 to one of the tie bars 120. In the example illustrated, a first one of the locking devices 200 (identified as first locking device 200a) is mounted to the first platen 114 and associated with a first one of the tie bars 120 (identified as first tie bar 120a). The first locking device 200a selectively secures the first platen 114 to, and releases the first platen 114 from, the first tie bar 120a.

Figure 4:
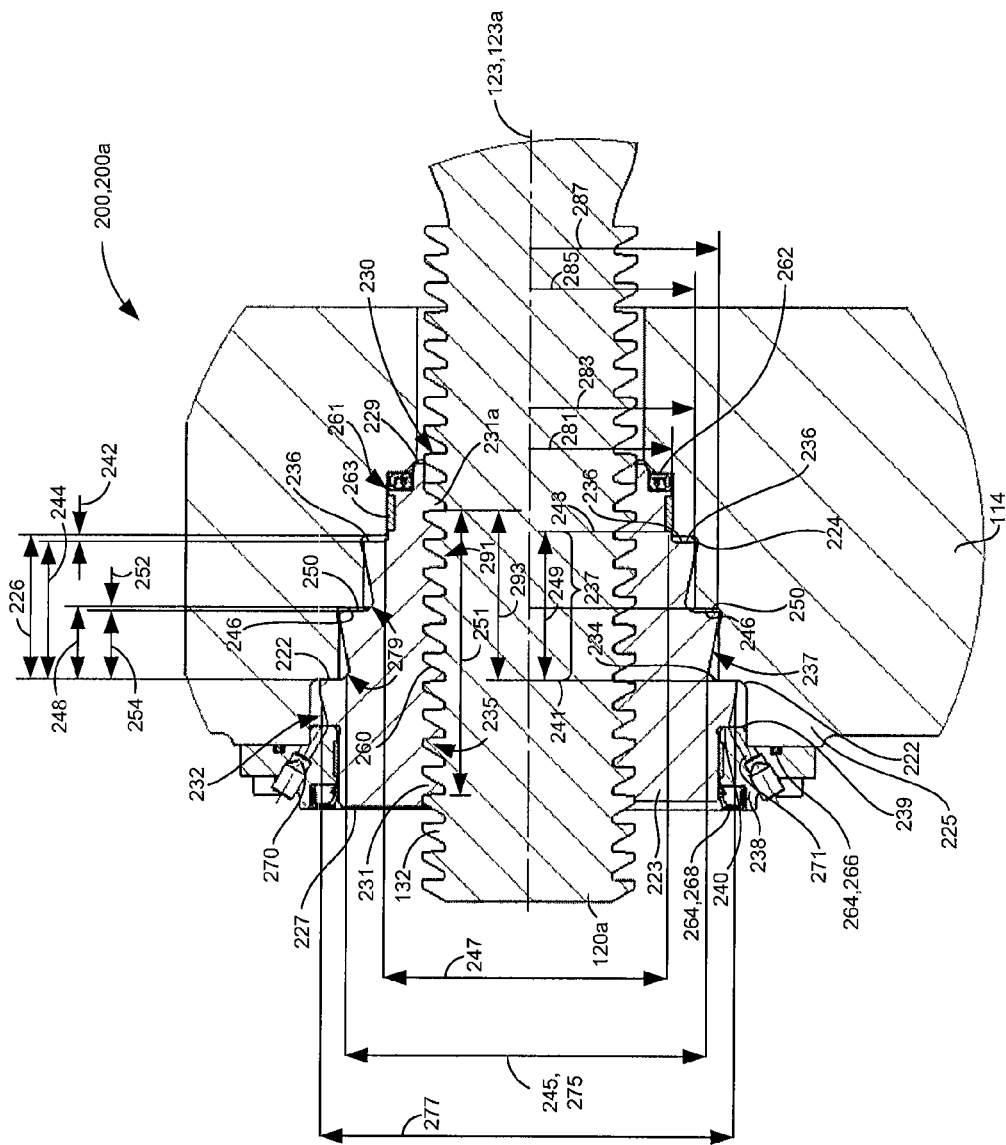
FIG. 4 is an enlarged view of a portion of the structure shown in FIG. 3.
Figure 5:
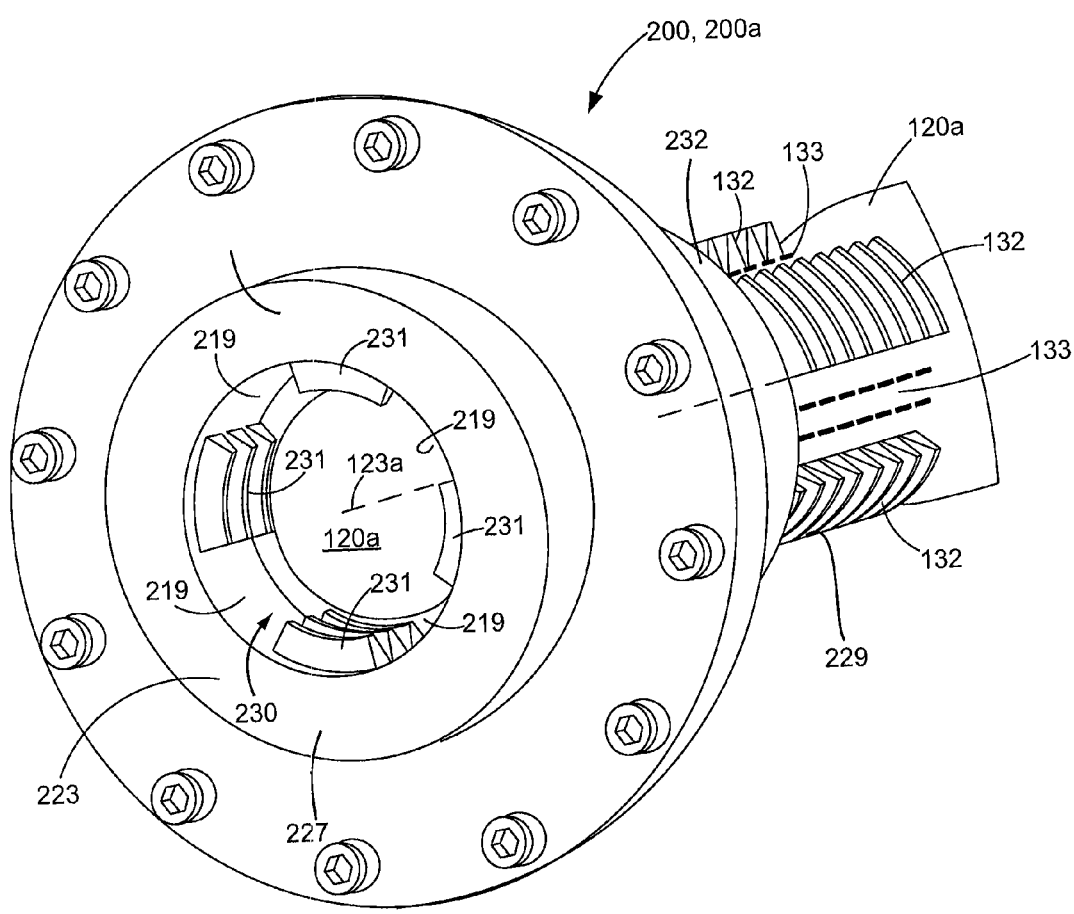
FIG. 5 is a perspective view of a lock nut of the locking device of FIG. 2, shown in an unlocked position.

With reference to FIGS. 4 and 5, the first locking device 200a can comprise, for example, a lock nut element 223 of generally annular construction rotatably disposed in a housing 225 affixed to the moving platen 114. In the example illustrated, the lock nut 223 is provided with an inner bore with inwardly projecting elements, such as first teeth 231, which are arranged in axial rows that are spaced circumferentially apart by first axial grooves 219. The first tie bar 120a (having a first tie bar axis 123a parallel to the machine axis 122) can be provided with second teeth 132 that are similarly arranged in axial rows, spaced apart circumferentially by second axial grooves 133.

When in the locked position (as shown in FIG. 4), the first and second teeth 231, 132 are oriented to be in circumferential registration with each other, so that the first and second teeth inter-engage, thereby inhibiting relative axial motion between the first platen 114 and tie bar 120a. The lock nut 223 can be rotated relative to the tie bar 120 to an unlocked position (see FIG. 5) in which the first teeth 231 are aligned with the second axial grooves 133 provided on the tie bar 120, and the second teeth 132 are aligned with the first axial grooves 219 of the lock nut 223, thereby allowing axial movement of the tie bar 120 through the lock nut 223.

Before moving the locking nut 223 from the unlocked to the locked position, the tie bar 120 can be moved axially relative to the lock nut 223 to any one of a plurality of meshing positions in which the peaks of one set of teeth are in axial registration with the valleys between adjacent ones of the other set of teeth. Adjacent meshing positions are spaced apart axially by an amount generally equal to the pitch of the teeth. Providing a plurality of meshing positions can facilitate accommodating molds with different axial extents (different mold heights).

In one or more other examples, the locking device can comprise two half nuts, each having first engagement elements to engage teeth on the tie bar 120 when in the locked position, and which can be moved away from the tie bar 120 generally perpendicular to the axis thereof to be clear of the tie bar when in the unlocked position.

Referring again to FIGS. 1 and 3, the machine 110 further includes at least one clamping mechanism 136 mounted to one of the platens 114, 116 and associated with one of the tie bars 120 for exerting a clamping force on the platens 114, 116 during the injection mold cycle. In the example illustrated, the machine 110 includes a first clamping mechanism 136a mounted to the second platen 116 and associated with the first tie bar 120a. The first clamping mechanism 136a selectively exerts a first force (i.e. a clamping force or an axial clamp load) on the tie bar 120a, urging the first and second platens 114, 116 together. The clamping mechanism can exert a second force (mold break force) urging the first and second platens 114, 116 apart. The forces are transmitted along the tie bar 120a, through the locking device 200 (when in the locked position) to the platen 114.

In some examples, the relative positions of the clamping mechanisms 136 and the locking devices 200 can be reversed, so that, for example, the tie bars 120 are anchored via clamping mechanisms to a second platen that is a moving platen. The locking devices 200 can be affixed to a first platen that is a stationary platen.

Further details of the locking device 200 will now be described. With reference again to FIG. 4, in the example illustrated, the locking device 200 comprises a lock housing 225 having an inner surface affixed to the moving platen 114 and extending coaxially with the tie bar axis 123a. In the example illustrated, the housing 225 is integral with the platen 114 and comprises a bore provided in the platen 114. In other examples, the housing 225 can be separately attached to the platen.

The inner surface of the housing 225 comprises a first bearing surface 222 that is generally annular and extends generally radially inwardly of the housing 225. The first bearing surface 222 can be oriented generally orthogonally to the tie bar axis 123. The housing 225 can extend axially between a distal housing end spaced away from the stationary platen 116, and a proximal housing end spaced axially apart from the distal housing end in a direction towards the stationary platen 116. The first bearing surface 222 is directed towards (i.e. faces) the distal housing end of the housing 225.

The lock nut 223 of the locking device 200 is received within the housing 225 and rotatable within the housing 225 about the axis 123a between the locked and unlocked positions. With reference to FIGS. 4 and 5, the lock nut 223 has a generally annular body with axially opposite first and second ends 227, 229. The first end (distal end) 227 is directed away from the stationary platen 116, and the second end (proximal end) 229 is directed towards the stationary platen 116. The inner bore 230 extends coaxially through the nut 223 from the first end to the second end, for receiving the tie bar 120 therethrough. The inner bore 230 defines a radially inner surface having radially inwardly projecting engagement elements 231 (i.e. first teeth 231 in the example illustrated) extending therefrom. The projecting elements 231 engage the tie bar 120 when the lock nut 223 is in the locked position, to transfer the axial clamp load (and unclamp load) from the tie bar 120 to the lock nut 223.

With reference to FIG. 4, the body of the lock nut 223 has a radially outer surface 232 opposite the inner surface. The outer surface 232 includes a first step face 234 for abutting the first bearing surfaces 222 to transfer the axial clamp load from the lock nut 223 to the platen 114. The first step face 234 is generally annular, and has a first outer radial extent 277 and a first inner radial extent 275. The first outer radial extent 277 of the first step face 234 is greater than the inner radial extent of the first bearing surface 222. The first step face 234 is, in the example illustrated, a generally planar surface oriented generally perpendicular to the axis 123.

The radially inwardly projecting engagement elements 231 are provided axially along a first axial extent 251 of the lock nut 223, defining a tie bar engagement portion 235 of the lock nut 223. Furthermore, the lock nut 223 has a major load portion 291 having a third axial extent 293 bounded by the first step face 234 and a first one 231a of the plurality of radially inwardly projecting engagement elements 231, the first inwardly projecting engagement element 231a being the element 231 axially nearest the second platen 116.

Referring still to FIG. 4, the lock nut 223 further includes a narrowing section 237 having a second axial extent 249 bounded by a first position 241 proximate the first step face 234 and a second position 243 spaced axially from the first position 241 in a direction towards the second platen 116. The outer diameter of the outer surface of the lock nut 223 is reduced across the second axial extent 249 of the narrowing section 237 from the first position 241 to the second position 243. The reduction in diameter of the narrowing section 237 can be provided by one or more sloped or tapered portions, or by one or more steps, or by a combination of tapers and steps. The outer surface of the lock nut across the narrowing section 237 can have one or more axial sections that are of constant outer diameter, or that increase in diameter (e.g. as may be provided in cases where stress relief fillets or pockets are formed at the radially inner end of any step faces. e.g. fillets 279 shown in FIG. 4).

In the example illustrated, the narrowing section 237 has a first diameter 245 at the first position 241, and a second diameter 247 at the second position 243. The first position is located immediately beside the first step face, towards the stationary platen, and the first diameter generally corresponds to the radially inner extent 275 of the first step face 234. The first diameter 245 is greater than the second diameter 247. For example, the first diameter 245 may be at least about 5 percent larger, and more specifically, between about 5 percent and about 30 percent larger than the second diameter 247.

The narrowing section 237 of the lock nut can extend at least partially within the tie bar engagement portion 235 (the second axial extent of the narrowing section can partially overlap the first axial extent of the tie bar engagement portion). In the example illustrated, the narrowing section 237 has a second axial extent 249 that is about half of the first axial extent 251 of the tie bar engagement portion 235. The narrowing section 237 may extend entirely within the tie bar engagement portion 235, or only a portion of the narrowing section 237 may be within the tie bar engagement portion 235.

In the example illustrated, the narrowing section 237 includes a stepped outer surface. The outer surface 232 includes at least a second step face 236 spaced axially apart from the first step face in a direction towards the second platen 116. The outer surface can further includes a third step face 250 intermediate the second step face 236 and the first step face 234. The second 236 and third 250 step faces are generally planar annular surfaces oriented generally perpendicular to the axis 123. The second step face extends radially between a second inner radial extent 281 and a second outer radial extent 283. The third step face extends radially between a third inner radial extent 385 and a third radial outer extent 387. The third outer radial extent 387 is less than the first outer radial extent 277 of the first step face 234, and the second outer radial extent 283 is less than the third outer radial extent 387 of the third step face 250. The second position 243 is proximate the second step face 236 (on the side of the second step face proximate the second platen 116). The second diameter 247 can be less than the second outer radial extent 283 of the second step face 236, and is less than the first diameter 245.

The inner surface of the housing 225 can be stepped, providing a second bearing face 224 that extends generally radially inwardly of the housing 225 at an axial position nearer (or proximal) the stationary platen 116. In the example illustrated, the second bearing face 224 is positioned near the proximal housing end of the housing 225. The first and second bearing faces 222, 224 are spaced axially apart by a first housing spacing 226.

The housing 225 of the locking device 200 can include one or more additional bearing surfaces. In the example illustrated, the locking device 200 includes a third (intermediate) bearing surface 246 positioned axially intermediate the first and second bearing surfaces 222, 224. The third bearing surface 246 is spaced apart from the first bearing surface 222 by an intermediate housing spacing 248. The third bearing surface 246 is, in the example illustrated, oriented generally perpendicular to the axis 123. The second step face 136 is configured to abut the second bearing surface 224, and the third step face 250 is configured to abut the third bearing surface 246 to cooperatively transfer the axial clamp load from the lock nut 223 to the platen 114.

In the example illustrated, the first (distal) step face 234 abuts the first bearing surface 222 generally continuously during operation of the machine 110. The surfaces 234, 222 are in flush engagement whether or not a clamp load is being applied across the platens 114, 116. An annular retaining plate 238 can be mounted to the platen 114 for engaging the nut 223 and holding the first step face 234 against the first bearing surface 222. The retaining plate 238 can have a radially inwardly protruding wall 239 that bears against a shoulder surface 240 protruding radially outwardly from the nut 223, at an axial position spaced rearward (distally) of the first step face 234. The contact between the surfaces 222, 234 can serve a locating function, providing a known position of the teeth 231 relative to the moving platen 114 (and hence to the machine coordinate system), at least when the tie bars 120 and lock nut 223 are unloaded (i.e. in relaxed, untensioned state). Engagement between the faces 239 and 240 can also be used, in the illustrated example, to transfer an unclamp force from the nut 223 to the platen 114.

The second step face 236 can be spaced apart from the second bearing surface 224 when the lock nut 223 is unloaded (for example by a first stretch gap 242), and the second step face 236 can abut the second bearing surface 224 when the axial clamp load is applied to the nut 223. In the example illustrated, the second step face 236 is axially spaced apart from the first step face 234 by a first (proximal) nut spacing 244. The proximal nut spacing 244 is less than the first housing spacing 226 when the nut 223 is unloaded, the difference between the first housing spacing 226 and the first nut spacing 244 being equal to the first stretch gap 242.

In the example illustrated, the third step face 250 is spaced axially apart from the third bearing surface 246 (for example by an intermediate stretch gap 252) when the nut 223 is unloaded, and the third step face 250 abuts the third bearing surface 246 when the axial clamp load is applied to the nut 223. In the example illustrated, the intermediate step face 250 is axially spaced apart from the first step face 234 by a second (intermediate) nut spacing 254. The intermediate nut spacing 254 is less than the intermediate housing spacing 248 when the nut 223 is unloaded, the difference between the intermediate housing spacing 248 and the intermediate nut spacing 254 being equal to the intermediate stretch gap 252.

The intermediate stretch gap 252 is, in the example illustrated, less than the proximal stretch gap 242. In use, upon initial application pressure by the clamping mechanism 136, the tie bar 120 is urged towards the right (in FIG. 4), urging the lock nut 223 (through inter-engagement of the teeth 231, 132) also towards the right. Some of the clamp load is immediately transferred to the platen 114 from the nut 223 through the abutment of the first step face 234 against the first bearing surface 222. As the clamp load increases, the tie bar stretches, resulting in maximum rightward displacement of the rightmost end of the tie bar, and zero displacement at the left-most end of the tie bar 120. Along the axial extent of the tie bar 120 that is within the bore of the lock nut 223, the same is true (more axial displacement of the tie bar at the right or proximal end than at the left or distal end). The proximal and intermediate stretch gaps can allow the lock nut 223 to stretch axially with the tie bar, so that once full clamping pressure is reached, the load is distributed across the bearing surfaces 222, 246, and 224. The loading on the teeth 231, 132 can also be uniformly distributed across the axial extent of the lock nut 223 by accommodating tie bar stretch through the provision of the plural bearing surfaces 222, 224, 246 and the stretch gaps 242, 252.

Without provision for stretch gaps as disclosed above, the stepped lock nut 223 can still provide enhanced force distribution across the axial extent of the nut and the engaged teeth 231, 132. However, with the provision of the stretch gaps, the lock nut can stretch with the tie bar, and the stress on the tie bar and lock nut can be distributed more broadly and more uniformly. Without the steps and/or without the stretch gaps, the stress would generally be more concentrated in a localized axial position, typically near the front (proximal) end of the nut. More localized, concentrated stress loading can reduce the overall machine clamp capacity and/or reduce the service life of the locking device components, including the tie bar in some cases.

A generally sealed lubrication chamber 260 can be provided between at least a substantial portion of the radially outer surface of the locking nut 223 and the inner surface of the housing 225. Lubrication fluid can be provided in the lubrication chamber 260 to further facilitate rotation of the locking nut 223 between the locked and unlocked positions.

Referring still to FIG. 4, a seal journal 261 may be provided at a proximal end of the nut 223. The seal journal 261 may support a proximal seal 262 (e.g. a radial shaft seal), which can be provided between the outer surface of the nut 223 and the housing 225 at a proximal end of the nut to seal off the proximal end of the chamber 260. The seal journal may also support a guide ring 263.

A distal seal 264 can be provided at the distal end of the locking nut 223 to seal off the chamber 260 at the distal end. The distal seal 264, in the example illustrated, comprises a radially outer seal 266 (mounted between the housing 225 and the retainer 238) and a radially inner seal 268 (mounted between the nut 223 and the retainer 238). A valved fill port 270 can extend between the two seals 266, 268 for filling the chamber 260. A drain port 271 can similarly be provided, at a lower point around the circumference of the chamber 260. 36.

In the example illustrated, the distal seal 262 is spaced apart from the major load portion in a direction away from the second platen, and the proximate seal 264 is spaced apart from the major load portion in a direction towards the second platen.

In the example illustrated, the lubrication fluid can be unpressurized, i.e. maintained at generally atmospheric pressure, since the locking device 200 is free of (or isolated from) any pressure chambers for generating a clamping force or an unclamp force. This can reduce the pressure rating requirements for the seals 262, 264 which can permit use of lower friction seals, which in turn can further reduce the time and energy required to move the locking device 200 between the locked and unlocked positions.

Figure 6:
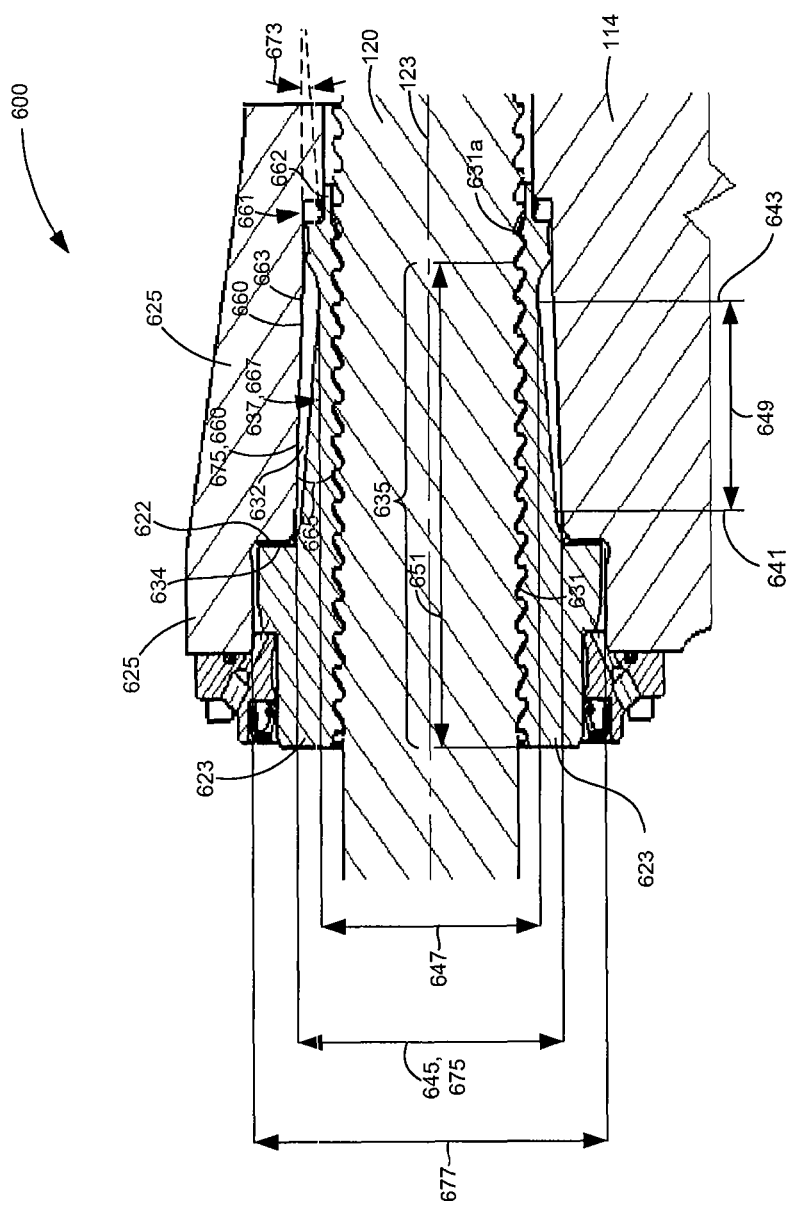
FIG. 6 is a cross-sectional view of an alternate locking device, shown in a similar view as FIG. 4.

An alternate example of a locking device 600 is shown in FIG. 6. The locking device 600 is similar to the locking device 200, and like features of the locking device 600 are identified with like reference numerals, incremented by 400.

The locking device 600 includes a housing 625 and a lock nut 623. The lock nut 623 is received within the housing 625 and is rotatable within the housing 625 about the axis 123 between the locked and unlocked positions, as described hereinabove with respect to FIGS. 2 to 5.

In the locking device 600, the housing 625 includes a first bearing surface 622, and the lock nut 623 includes a first step face 634, which abuts the first bearing surface 622 to transfer the axial clamp load from the lock nut 623 to the second platen 114. In the locking device 600, the first step face 634 abuts the first bearing surface 622 generally continuously during operation of the machine 110. The first step 634 is generally annular, extending between an inner radial extent 675 and an outer radial extent 677, which in the example illustrated, generally correspond to an inner diameter of about 132 mm and an outer diameter of about 180 mm.

Figure 7:
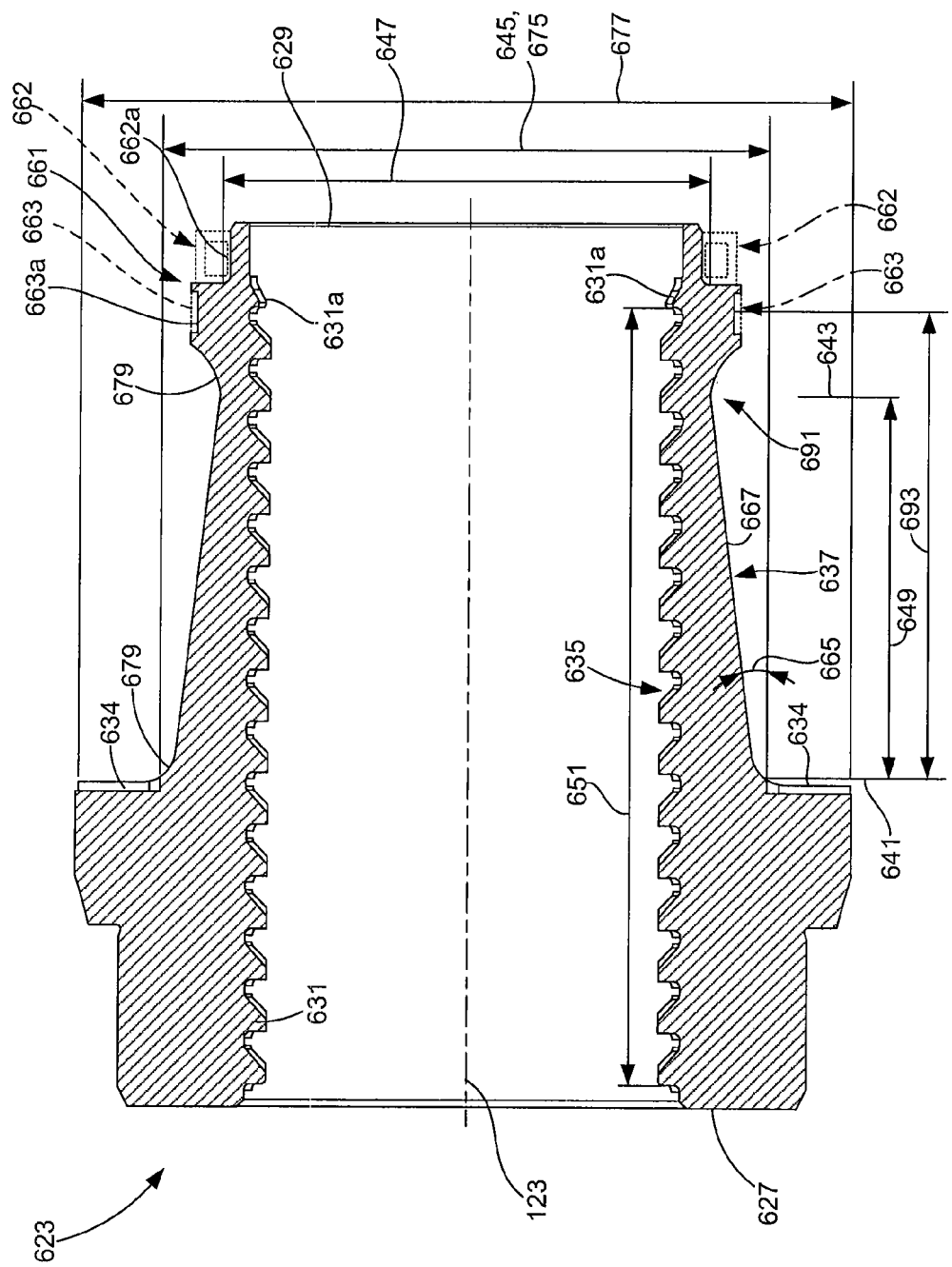
FIG. 7 is a cross-sectional view of a lock nut member of the locking device of FIG. 6.

With reference also to FIG. 7, the radially inwardly projecting engagement elements 631 are provided axially along a first axial extent 651 of the lock nut 623, defining a tie bar engagement portion 635 of the lock nut 623. Furthermore, the lock nut 623 has a major load portion 691 having a third axial extent 693 bounded by the first step face 634 and a first one 631a of the plurality of radially inwardly projecting engagement elements 631, the first inwardly projecting engagement element 631a being the element 631 axially nearest the second platen 116

The lock nut 623 further includes a narrowing section 637. The narrowing section 637 extends at least partially within the tie bar engagement portion 635, and extends from a first position 641 adjacent (and at the proximate side of) the first step face 634, to a second position 643 spaced axially apart from the first step face 634 in a direction towards the second platen. The narrowing section 637 has a first diameter 645 at the first position 641 (proximate the first step face 634), and a second diameter 647 at the second position 643 (spaced axially away from the first position towards the stationary platen), and the first diameter 645 is greater than the second diameter 647. The first diameter can be from about 5 percent to about 30 percent larger than the second diameter. In the example illustrated, the first diameter 645 is about 132 mm (generally equal to the inner diameter or radial extent 675 of the first step face 634), and the second diameter 647 is about 115 mm, so that the first diameter 645 is about 15 percent greater than the second diameter 647.

In the example of the locking device 600 illustrated, the narrowing section 637 comprises a taper 667. Particularly, the outer surface 632 between the first 641 and second 643 positions comprises a taper 667. The taper 667 can help to allow the lock nut 623 to stretch axially with the tie bar, which can result in an enhanced stress distribution of the clamp force among the engagement elements 631. In the example illustrated, the taper 667 extends generally linearly (at a constant slope) from the first position 641 to the second position 643. The included angle between the taper (outer tapered surface) 667 and the axis 123 defines a lock nut taper angle 665 that is generally constant over the axial extent 649 of the narrowing section 637. The lock nut taper angle 665 can be at least about 5 degrees, for example between about 5 and 35 degrees. In the example illustrated, the lock nut taper angle 665 is about 7 degrees.

In the example illustrated, the narrowing section 637 has an axial extent 649 that is positioned entirely within the tie bar engagement portion 635. The axial extent 649 of the narrowing section 637 can be about 50% of the axial extent 651 of the tie bar engagement portion 635. Further, in the example illustrated, the first diameter 645 is about 135 mm and the second diameter 647 is about 115 mm, so that the first diameter 645 is about 17 percent larger than the second diameter 647.

In the example illustrated, the inner surface of the housing 625 comprises a relief portion 669 that is in facing relation to the taper 667. The relief portion 669 has an inner surface that is sized to accommodate the outer surface of the taper portion 667 of the locking device 600. The diameter of the relief portion can decrease in a direction of the axial clamp load, or can be generally of constant diameter. In the example illustrated, the relief portion 669 decreases in diameter with a generally constant slope at least over the axial extent overlapping the taper 667, and the included angle between the relief portion and the axis 123 defines a relief angle 673 that, in the example illustrated, is greater than the taper angle 665.

A radial gap 675 between the portion 669 of the inner surface and the outer surface 632 of the lock nut along the axial extent of the taper 667 defines a generally sealed lubrication chamber 660. Lubrication fluid can be provided in the lubrication chamber 660 to further facilitate rotation of the locking nut 623 between the locked and unlocked positions.

A seal journal 661 is provided at a proximal end of the nut 623. The seal journal 661 is adjacent the second position 643, and has an outer diameter that is greater than the second diameter 645 at the second position 643, and less than the first diameter 645 at the first position 641. In the example illustrated, the seal journal 661 includes an outer radial pocket 663a for supporting a glide seal 663, and the journal 661 further includes a front seal seat 662a spaced axially between the pocket 663a and the proximal end 629 of the lock nut 623. The front seal seat 662a receives a radial shaft seal 662 having an outer diameter that is less than or equal to the outer diameter of the glide seal 663a, which can facilitate assembly of the seal 662 onto the nut 623 and then into the housing 625 of the platen 614.

Figure 8:
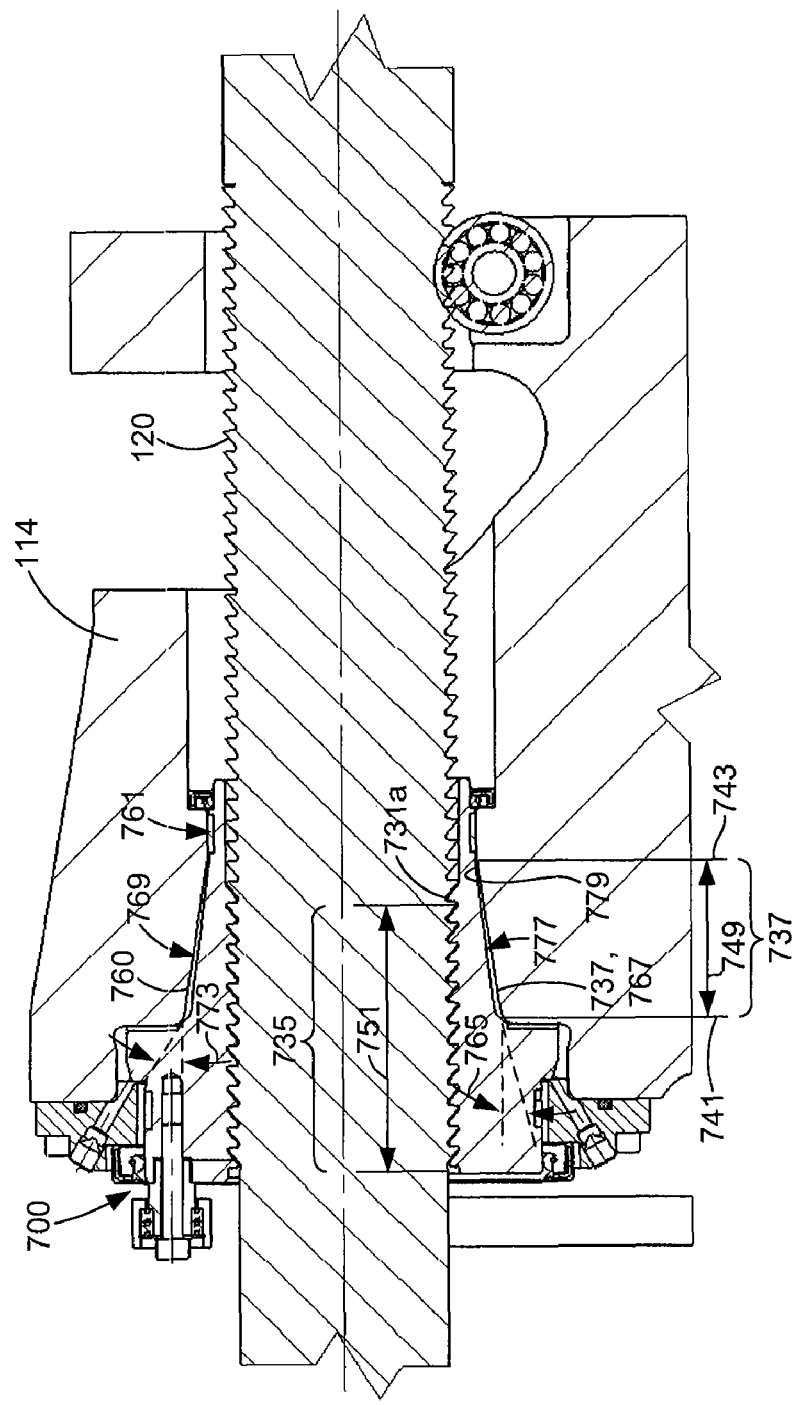
FIG. 8 is a cross-sectional view of another alternate locking device, shown in a similar view as FIG. 4.

An alternate example of a locking device 700 is shown in FIG. 8. The locking device 700 is similar to the locking device 600, and like features of the locking device 700 are identified by like reference numerals as the lock nut 600, incremented by 100.

The locking device 700 comprises a narrowing section 737 that comprises a taper 767. Particularly, the outer surface 732 between the first 741 and second 743 positions comprises a taper 767. As exemplified, the taper 767 extends generally linearly between the first position 741 and the second position 743, and the taper 767 and the axis 123 define a lock nut taper angle 765 that is generally constant over the axial extent 749 of the narrowing section 737. In the example illustrated, the lock nut taper angle 765 is about 10 degrees.

As exemplified, the first position 741 is axially within the tie bar engagement portion 735, and the second position 743 is spaced axially from the tie bar engagement portion 735 in a direction of the axial clamp load, so that only a first portion 777 of the narrowing section 737 extends within the tie bar engagement portion 735. A second portion 779 of the narrowing section 737 is adjacent and spaced axially from the tie bar engagement portion 735 in a direction of the axial clamp load. In some examples, at least 70 percent of the axial extent 749 of the narrowing section 737 may be within the tie bar engagement portion 735. As exemplified, the first portion 777 comprises about 80% of the axial extent 749 of the narrowing section 737. Further, as exemplified, the first portion 777 has an axial extent that is about 50% of the axial extent 751 of the tie bar engagement portion 735.

As exemplified, the inner surface of the housing 725 comprises a portion 769 that is in facing relation to the taper 767. In the example shown, the diameter of the portion 769 decreases in a direction of the axial clamp load. Further, in the example shown, the diameter of the portion 769 decreases to the same degree as the taper 767 of the lock nut 723, so that the portion 769 and the axis 123 define a relief angle 773 that is the same as the taper angle 765.

In use, the portion 769 of the inner surface abuts the taper 767 generally continuously during operation of the machine 110, so that at least a portion of the axial clamp load is transferred from the taper 767 to the portion 769 of the inner surface. As exemplified, the relief portion 769 of the inner surface and the taper 767 are spaced apart slightly along the axial extent to leave a space for lubrication chamber 760, whether or not a clamp load is being applied across the platens 114, 116.

A proximal seal journal 761 is provided at a proximal end of the nut 723. As exemplified, the seal journal 761 is adjacent the second position 741, and has an outer diameter that is substantially the same as the second diameter 745 at the second position 743.

It will be appreciated that, in alternate examples, a narrowing section may include both a taper and a stepped section. In further alternate examples, any steps of the step section may or may not bear against a bearing surface of the housing. In further alternate examples, a tie bar engagement portion may be entirely axially within a narrowing section.

While the above description provides examples of one or more processes or apparatuses, it will be appreciated that other processes or apparatuses may be within the scope of the accompanying claims.

The invention claimed is:

1. In combination, first and second platens of an injection molding machine, a tie bar extending from the second platen to the first platen, and a locking device for releasably securing together the tie bar and the first platen, the locking device comprising:
   a) a housing extending along an axis coaxial with the tie bar and including a first bearing surface affixed to the first platen;
   b) a lock nut received in the housing and rotatable within the housing about the axis between locked and unlocked positions, the lock nut comprising:
      i) an inner bore with radially inwardly projecting engagement elements that engage the tie bar when in the locked position to transfer an axial clamp load from the tie bar to the lock nut, the radially inwardly projecting engagement elements provided along a first axial extent of the lock nut and defining a tie bar engagement portion;
      ii) an outer surface with at least a first step face retained in abutting relation against the first bearing surface to transfer the axial clamp load from the lock nut to the first platen, the first step face having a first radially outer extent; and,
      iii) the lock nut including a narrowing section having a second axial extent bounded by a first position proximate the first step face and a second position spaced axially from the first step face in a direction towards the second platen,
   wherein the outer surface has a first diameter at the first position and a second diameter at the second position, the first diameter being less than the first radially outer extent and greater than the second diameter, and
   wherein the lock nut further comprises a major load portion having a third axial extent bounded by the first step face and a first one of the plurality of radially inwardly projecting engagement elements, the first one of the radially inwardly projecting engagement elements being axially nearest the second platen; and
   wherein the outer surface of the lock nut along the narrowing section is defined by a tapered surface that starts at the first position and ends at the second position; and
   wherein the second axial extent of the narrowing section is at least as great as the third axial extent of the major load portion.

2. The combination of claim 1, wherein the second axial extent of the narrowing section extends axially along at least about half of the first axial extent of the tie bar engagement portion.

3. The combination of claim 2, wherein the second axial extent of the narrowing section extends entirely within the first axial extent of the tie bar engagement portion.

4. The combination of claim 2, wherein the first position is axially within the tie bar engagement portion, and the second position is spaced axially from the tie bar engagement portion in a direction towards the second platen so that only a portion of the narrowing section extends within the tie bar engagement portion.

5. The combination of claim 4, wherein at least about 70 percent of the second axial extent of the narrowing section is within the first axial extent of the tie bar engagement portion.

6. The combination of claim 1, wherein the second axial extent of the narrowing section overlaps at least about half of the third axial extent of the major load portion.

7. The combination of claim 1, wherein the second axial extent of the narrowing section overlaps at least about 80 percent of the third axial extent of the major load portion.

8. The combination of claim 1, wherein the third axial extent of the major load portion extends entirely within the second axial extent of the narrowing section.

9. The combination of claim 1, wherein the first diameter is at least about 5 percent larger than the second diameter.

10. The combination of claim 9, wherein the first diameter is between about 10 percent and about 30 percent larger than the second diameter.

11. The combination of claim 1, wherein an inner surface of the housing comprises a relief portion in facing relation to the tapered surface, the tapered surface and the axis define a lock nut taper angle, the relief portion of the inner surface and the axis define a relief angle, and the lock nut taper angle is greater than the relief angle.

12. The combination of claim 11, wherein the diameter of the relief portion of the inner surface of the housing decreases in a direction towards the second platen.

13. The combination of claim 1, further comprising a distal seal and a proximal seal spaced axially apart from each other for sealing the interface between the outer surface of the lock nut and an inner surface of the housing.

14. The combination of claim 13, wherein the distal seal is spaced apart from the major load portion in a direction away from the second platen.

15. The combination of claim 14, wherein the proximal seal is spaced apart from the major load portion in a direction towards the second platen.

16. The combination of claim 13, further comprising a lubrication channel bounded axially by the distal seal and the proximal seal, and bounded radially by the outer surface of the lock nut and the inner surface of the housing.

17. In combination, first and second platens of an injection molding machine, a tie bar extending from the second platen to the first platen, and a locking device for releasably securing together the tie bar and the first platen, the locking device comprising:
   a) a housing extending along an axis coaxial with the tie bar and including a first bearing surface and a second bearing surface affixed to the first platen, the second bearing surface spaced axially apart from the first bearing surface by a first housing spacing; and
   b) a lock nut received in the housing and rotatable within the housing about the axis between locked and unlocked positions, the lock nut including an inner bore with radially inwardly projecting engagement elements that engage the tie bar when in the locked position to transfer an axial clamp load from the tie bar to the lock nut, and the lock nut including an outer surface with first and second step faces for abutting the first and second bearing surfaces, respectively, to cooperatively transfer the axial clamp load from the lock nut to the first platen.

18. The combination of claim 17, wherein the first step face abuts the first bearing surface when the axial load is applied to the nut and when the nut is unloaded, wherein the second step face is spaced apart from the second bearing surface when the lock nut is unloaded, and wherein the second step face abuts the second bearing surface when the axial clamp load is applied to the nut.

19. In combination, a pair of platens for supporting mold halves in an injection molding machine, a tie bar extending between the platens, and a locking device for releasably securing the tie bar to a first one of the platens, the locking device comprising:
   a) a housing fixed relative to the first platen and extending along an axis coaxial with the tie bar, the housing having an inner surface and a bearing surface extending radially inwardly from the inner surface;
   b) a lock nut received in the housing and rotatable within the housing between locked and unlocked positions, the lock nut comprising:
      i) an inner bore extending between axially opposed proximal and distal open ends,
      ii) a plurality of engagement elements projecting radially inwardly of the bore for engagement with the tie bar, the plurality of engagement elements including a first engagement element positioned nearest the proximal open end of the bore;
      iii) an outer surface having a radially outwardly directed step face spaced axially apart from the first engagement element in a direction away from the proximal end of the bore, the step face retained in abutting relation against the bearing surface of the housing, and the outer surface having a tapered surface extending along at least about 90 percent of the axial spacing between the step face and the first engagement element, the tapered surface converging from a larger diameter adjacent the step face to a smaller diameter adjacent the first engagement element.

20. The combination of claim 19, wherein the tapered surface extends along the entirety of the axial spacing between the step face and the first engagement element.

* * * * *